Feb. 20, 1962

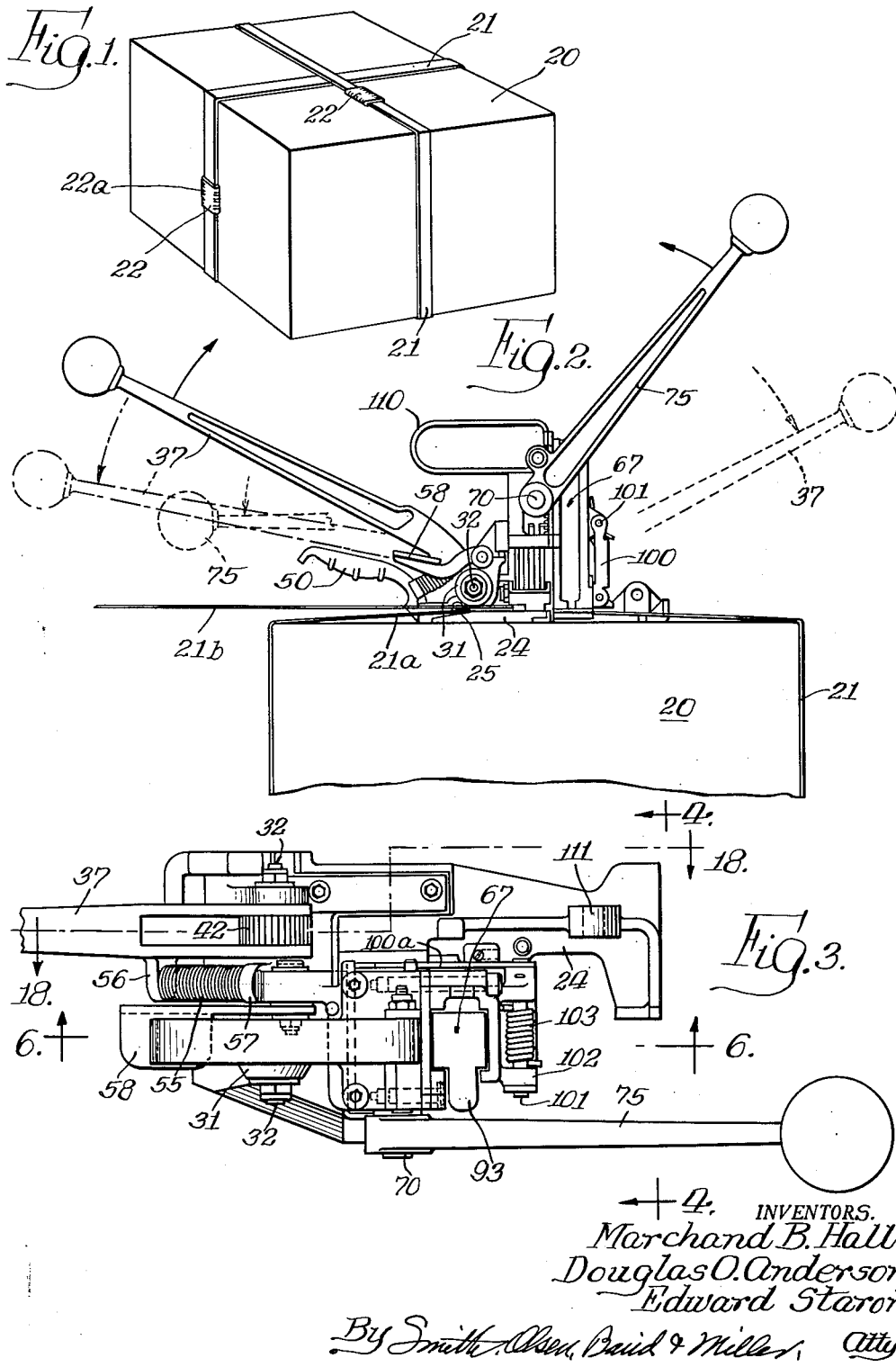

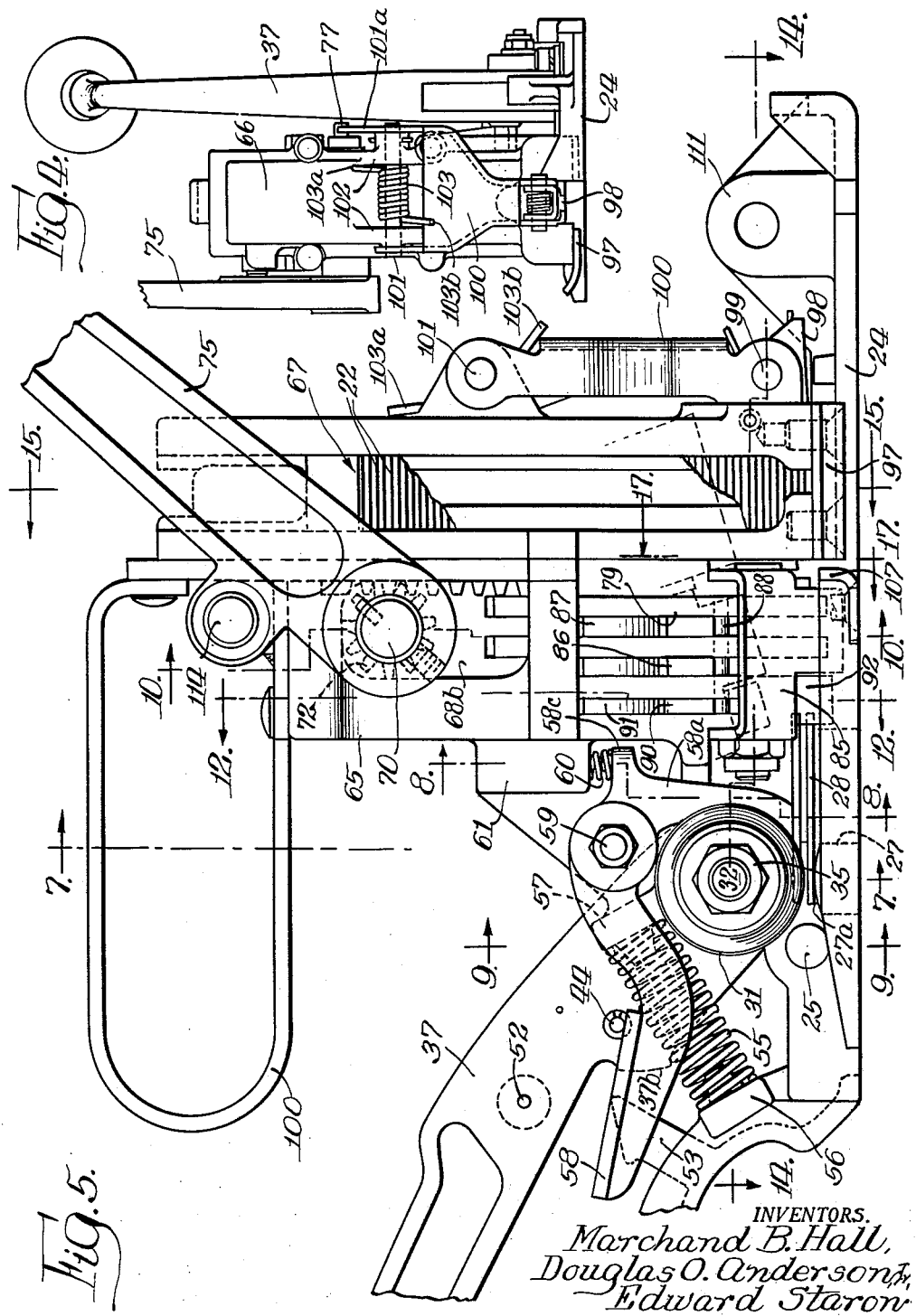

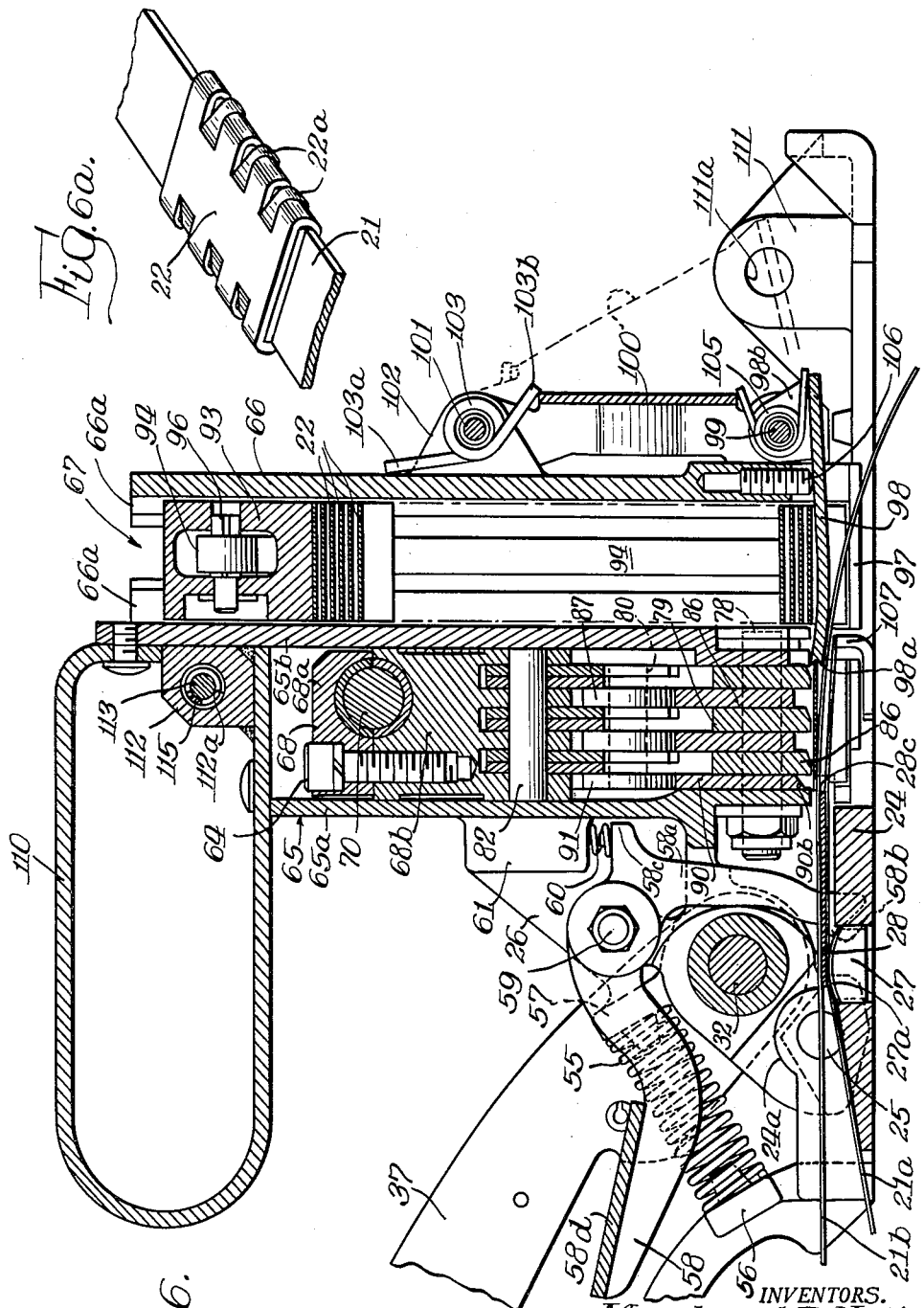

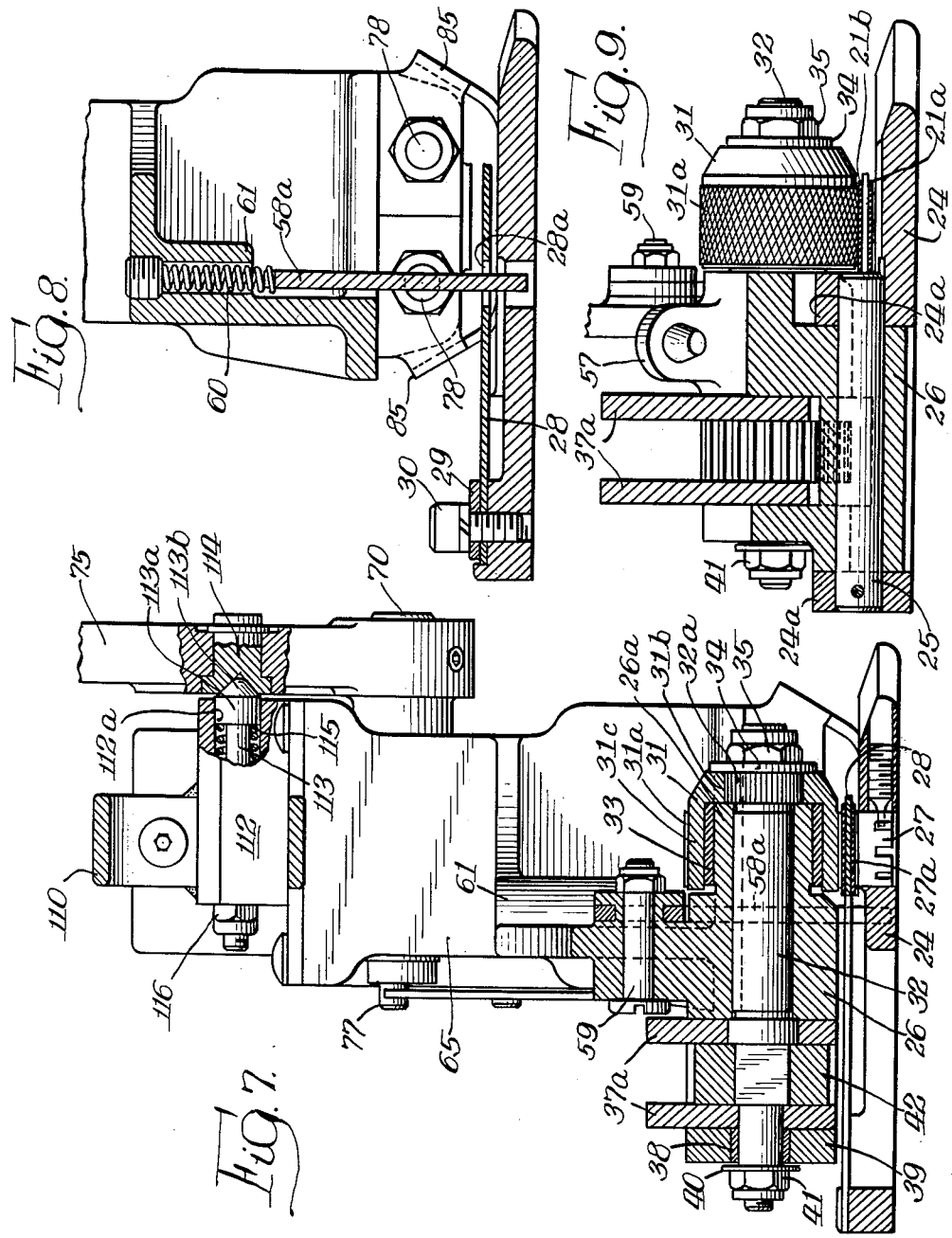

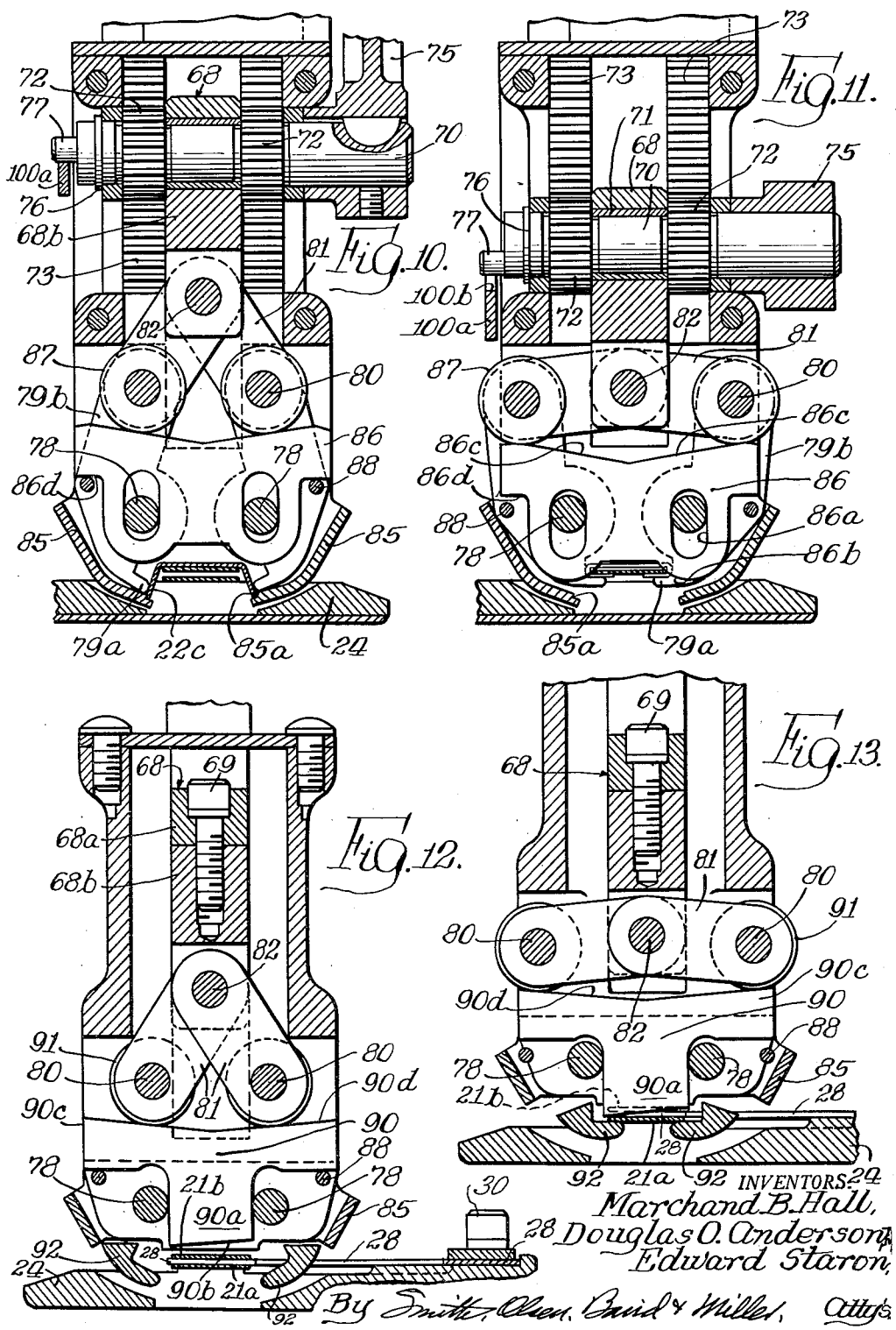

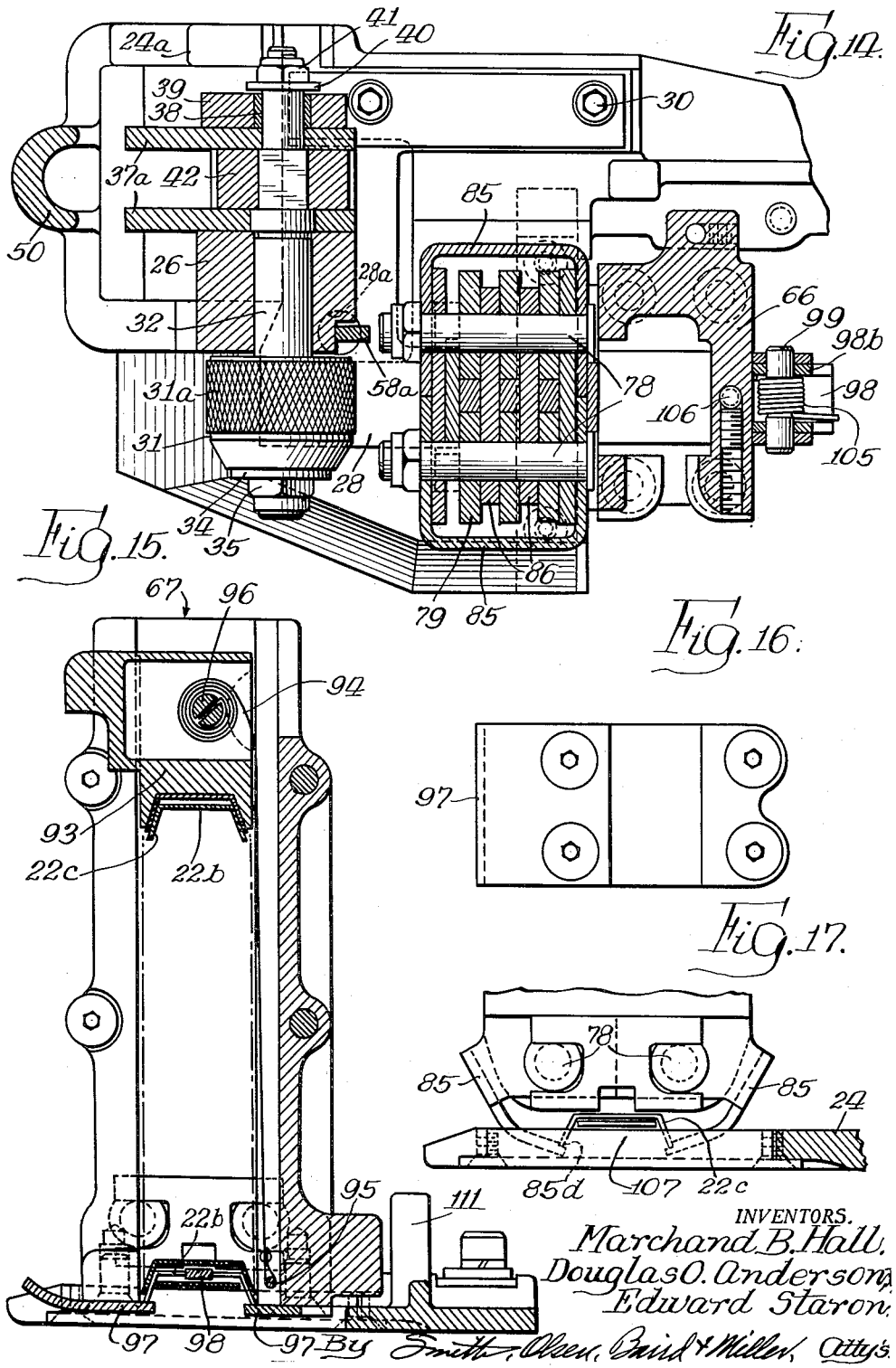

M. B. HALL ETAL 3,021,876

STRAPPING TOOL

Filed Aug. 30, 1956

INVENTORS
Marchand B. Hall,
Douglas O. Anderson,
Edward Staron
By Smith, Olsen, Buid & Miller, Attys.

United States Patent Office 3,021,876
Patented Feb. 20, 1962

3,021,876
STRAPPING TOOL
Marchand B. Hall, Olympia Fields, Douglas O. Anderson, Jr., Park Forest, and Edward Staron, Evergreen Park, Ill., assignors to Acme Steel Company, Chicago, Ill., a corporation of Illinois
Filed Aug. 30, 1956, Ser. No. 607,044
12 Claims. (Cl. 140—93.4)

This invention relates to improvements in strapping tools and its purpose is to provide novel apparatus for use in applying a metal binding strap around a box, package or the like, whereby a loop of metal strapping is drawn taut about the object to be bound, an interlocking joint is formed between the overlapping strap ends, and the strap is then severed from the supply.

The present improvements may be used with particular advantage in that type of strapping tool in which the strap is drawn taut around a package or the like by successive operations of a tensioning lever, after which a metal seal is fed from a magazine to a position embracing the overlapping strap portions, sealing mechanism is then operated to deform the seal and the overlapping strap portions to form an interlocking joint, and the supply portion of the strap is then cut off adjacent to the seal.

The principal object of the present invention is to provide an improved strapping tool of this type having a minimum number of operating parts and one which may be easily operated and may be manufactured at relatively small cost. A further object is to provide improved means for gripping the free end of the strap passed around the package, utilizing a strap shearing blade as a part of the gripping means and thereby simplifying the construction. A further object is to provide improved strap shearing means whereby the supply portion of the strap is cut off completely in proximity to the joint forming seal, without danger of severing the underlying portion of the strap which is drawn taut around the object being bound. Still another object of the invention is to provide a strap sealing tool comprising a rotary tensioning wheel positioned above a stationary resilient shearing blade which cooperates with an underlying gripper plate to hold the free end of the strap and which cooperates with the tensioning wheel to hold the supply portion of the strap as the strap is drawn taut and which cooperates with a movable shearing blade to sever the supply portion of the strap as the joint is completed. Another object of the invention is to provide novel means for holding a seal in joint forming position independently of the sealing mechanism and for preventing the feeding of a seal to that position until the sealing mechanism has been retracted from its operative position. A further object is to provide a strapping tool comprising a shearing blade in combination with retractable means for supporting the strap when it is being sheared. Still another object of the invention is to provide improved operating mechanism for the sealing device and novel means for holding the device in a retracted position. A further object of the invention is to provide novel means for actuating the sealing jaws of the sealing mechanism and novel means for supporting a seal in the sealing head. Another object is to provide improved means for actuating the movable shearing blade by which the strap is severed when the joint has been formed. Other objects relate to various features of construction and arrangement which will appear more fully hereinafter.

The nature of the invention will be understood from the following specification taken with the accompanying drawings in which one embodiment is illustrated. In the drawings, FIGURE 1 is a perspective view of a box or package surrounded by metal binding straps having their overlapping ends united by metal seals which may be deformed to provide interlocking joints with the use of the tool of the present invention;

FIG. 2 shows a side elevation of the strapping tool of the present invention applied to a box or package for drawing a metal strap taut around this object and then applying a metal seal and deforming the seal to provide a joint, preliminary to cutting off the strap from the source of supply;

FIG. 3 shows a top plan view of the strapping tool illustrated in FIG. 1;

FIG. 4 shows an end elevation of the strapping tool illustrated in FIGS. 2 and 3, looking toward the left as viewed in FIG. 3;

FIG. 5 shows on an enlarged scale a front elevation of the principal parts of the strapping tool as they are illustrated in FIG. 2;

FIG. 6 shows an enlarged vertical section taken on the line 6—6 of FIG. 3;

FIG. 6a shows a perspective view of the overlapping strap ends with a surrounding seal which has been deformed to provide an interlocking joint in the manner in which a joint is formed with the use of the tool of the present invention;

FIG. 7 shows a vertical section taken on the line 7—7 of FIG. 5;

FIG. 8 shows a vertical section taken on the line 8—8 of FIG. 5;

FIG. 9 shows a vertical section taken on the line 9—9 of FIG. 5;

FIG. 10 shows a vertical section taken on the line 10—10 of FIG. 5, showing the sealing forming jaws and the punches in their retracted position;

FIG. 11 is a vertical section similar to that of FIG. 10 showing the sealing jaws and the punches in the positions which they occupy when a joint has been formed;

FIG. 12 is a vertical section taken on the line 12—12 of FIG. 5, illustrating the means by which a seal is fed to the joint forming position;

FIG. 13 is a vertical section similar to that of FIG. 12, illustrating the seal feeding means in its retracted position;

FIG. 14 shows a horizontal section taken on the line 14—14 of FIG. 5;

FIG. 15 shows a vertical section taken on the line 15—15 of FIG. 5;

FIG. 16 shows a bottom plan view of the right hand end portion of the tool illustrated in FIG. 14;

FIG. 17 shows a sectional view taken on the line 17—17 of FIG. 5; and

Figure 18:
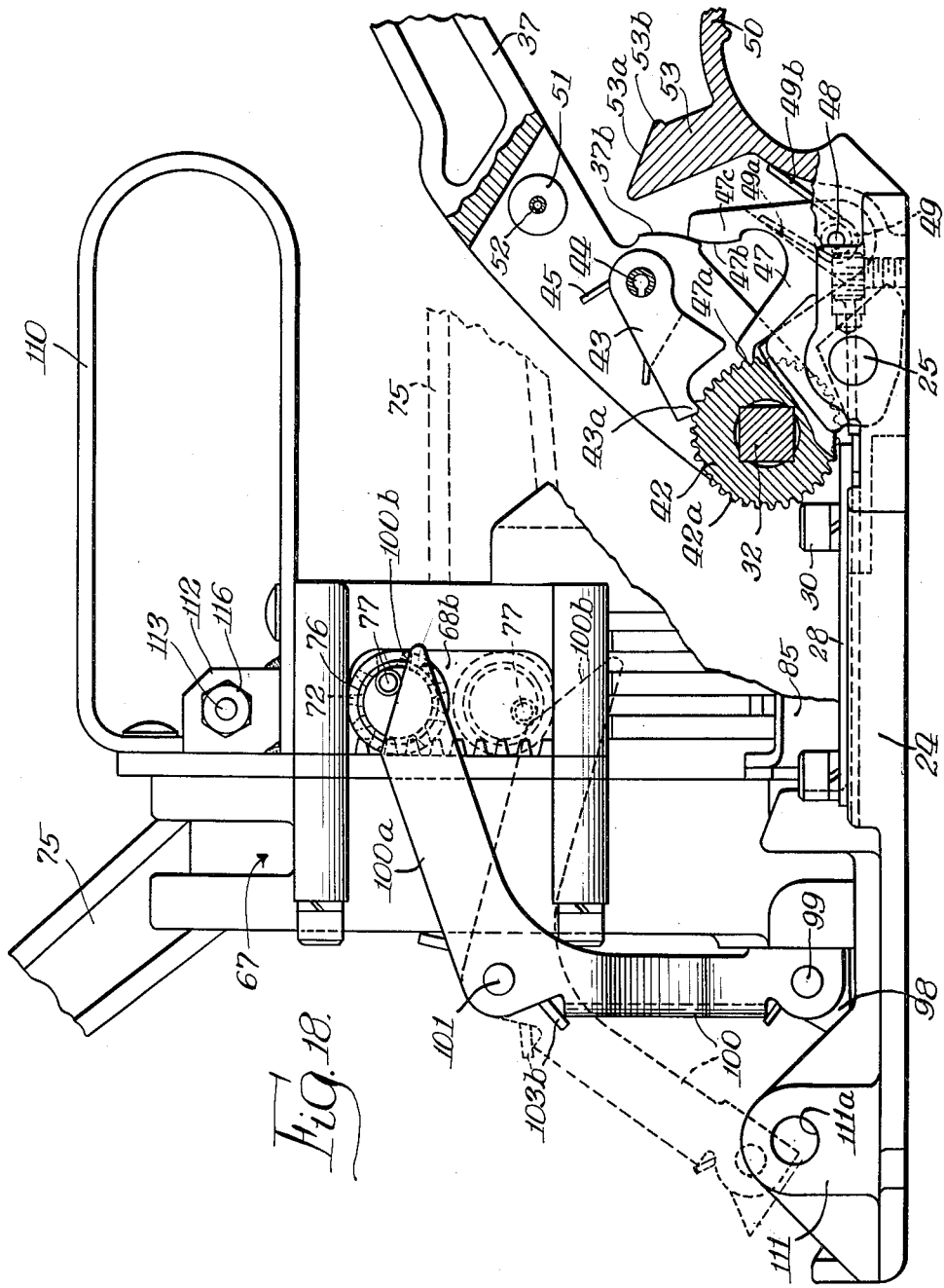
FIG. 18 shows a sectional view taken on the line 18—18 of FIG. 3.

In FIG. 1 of the drawings there is shown a box or package 20 which is reinforced by surrounding metal binding straps 21, each of which has its ends overlapping and secured together by a metal seal 22. An interlocking joint is formed with each seal by shearing the lateral edges of the seal and the enclosed strap ends and bending them transversely to the plane of the strap as shown at 22a, thus providing a familiar form of joint. The joint is particularly shown in FIG. 6a where the portions 22a of the seal and the enclosed strap ends are illustrated as being deflected to provide abutting shoulders between the seal and the strap ends. The seal 22, before being applied to the strap ends, has the channel shaped form which is shown particularly in FIG. 15, where each seal is illustrated as comprising a top wall 22b united with downwardly and outwardly flaring side walls 22c. In the operation of the tool, the side walls 22c are bent around the overlapping strap ends by the sealing jaws preliminary to the shearing of the edge portions of the seal and the enclosed strap ends and the deflection of the portions of the metal between the places where the shearing cuts are made.

Referring particularly to FIGS. 2, 5 and 6 of the drawings, the invention is illustrated as comprising a base plate or frame 24 which is adapted to rest upon the package or other object to be bound and which is provided with upstanding ears 24a having fixed therein a pin 25 upon which an auxiliary frame 26 is pivotally mounted. This auxiliary frame carries the strap tensioning means and the sealing means as well as the means for feeding seals from a storage magazine and the means for cutting off the strap from the source of supply when a joint has been formed.

The main frame 24 has removably mounted in the base plate thereof a gripping member 27 having an upper serrated gripping surface 27a adapted to be engaged by the free end portion 21a of the strap 20, as shown particularly in FIG. 6. After the strap has been looped around the box or other object to be bound, the supply portion 21b thereof is carried over the top surface of a thin, flexible and substantially stationary shearing blade 28 which is secured to the main frame 24 by means of a washer 29 and a stud 30, shown in FIG. 8. This shearing blade is formed of resilient steel and has a free end portion that normally occupies a position against and biased toward the gripping member 27 and the base plate of the frame (see FIG. 5 of the drawings). The free end portion of the shearing blade 28 may be sprung upwardly away from the gripping member 27 to permit the insertion of the free end of the strap and, when released, it bears upon the upper surface of the strap end to hold the strap in position while it is being drawn taut. This pressure of the shearing blade 28 on the strap is increased by the operation of the tensioning means which moves the supply portion 21b of the strap over the shearing blade as the tensioning operation proceeds.

The tensioning mechanism comprises a rotary gripping wheel 31 having a serrated cylindrical gripping surface 31a which is adapted to contact the upper surface of the portion 21b of the strap. As shown particularly in FIGS. 7, 9 and 14, this tensioning wheel 31 is secured on a shaft 32 which is journaled in bearings formed in the auxiliary frame 26. The tensioning wheel 31 has a radial end portion 31b which is keyed upon the enlarged portion 32a of the shaft and it has a cylindrical portion 31c adapted to revolve about a bearing sleeve 33 secured upon a cylindrical extension 26a of the auxiliary frame. The tensioning wheel 31 is secured on the shaft 32 by a washer 34 and a nut 35 which are mounted upon the threaded end of the shaft. The structure of the tensioning wheel and the method of mounting it are described and claimed in the copending application of Marchand B. Hall and Robert E. Fogg, Serial No. 574,879, filed March 29, 1956, now Patent No. 2,964,295 issued December 13, 1960.

The shaft 32 is adapted to be operated to rotate the tensioning wheel 31 by means of a tensioning lever 37, the lower end of which terminates in two parallel plates 37a which are apertured for rotatable engagement with the end portions of the shaft 32. The end portion of the shaft is journaled in a bushing 38 secured in a frame member 39 which is formed as a part of the auxiliary frame 26 and the threaded end of the shaft 32, adjacent to the member 39, is engaged by a washer 40 and a nut 41. Between the portions 37a of the tensioning lever 37, a ratchet wheel 42 is splined on the shaft 32 and the reciprocation of the lever is adapted to effect the intermittent rotation of the ratchet wheel and the corresponding rotation of the tensioning wheel 31.

The rotation of the ratchet wheel 42 is effected by a pawl 43 which is pivoted on a pin 44 extending between the side plates 37a of the lever. A coil spring 45 is mounted on the pin 44 with one end thereof secured to one of the side plates 37a and with the other end thereof engaging a shoulder of the pawl so that the tooth 43a of the pawl is normally forced into engagement with the teeth 42a of the ratchet wheel. Upon movement of the lever 37 toward the left, as viewed in FIG. 18, and toward the right as viewed in FIGS. 2 and 5, the pawl 43 thus effects the rotation of the ratchet wheel 42 and this brings about the rotation of the tensioning wheel 31 so that, if the tensioning wheel is then in engagement with the supply portion 21b of the strap, a movement of this portion of the strap to draw it taut will be effected. Upon reverse movement of the lever 37, the tooth 43a of the pawl rides over the teeth 42a of the ratchet wheel until the pawl reaches a new position where it is permitted to engage the teeth again in readiness for a new stroke. During this reverse movement of the lever 37 and the pawl 43, the ratchet wheel 42 is held against rotation by means of a detent 47 which is pivotally mounted upon a pin 48 carried by the main frame 24. This detent has a tooth 47a which is normally forced into engagement with the teeth of the ratchet wheel by means of a coil spring 49 which is mounted on the pin 48 and which has one arm 49a engaging a shoulder on the detent and another arm 49b which engages the lower extremity of a handle 50 which is formed on the lower end portion of the main frame 24. When the lever 37 and the pawl 43 are being moved through a forward stroke, the spring 49 permits the tooth of the detent 47 to ride over the teeth of the ratchet wheel until the end of the forward stroke is reached.

The tensioning lever 37 serves the double function of raising the auxiliary frame 26 and also elevating the rotary gripping wheel 31, thus eliminating the requirement for two levers. Another advantage is that, during the strap tensioning operation, the strap is guided by the side plates of the sealer head so that no auxiliary guides are required.

In order to disengage the pawl 43 and the detent 47 from the ratchet wheel 42, to permit full rotation of the ratchet wheel and the tensioning wheel 31, one of the side plates of the lever 37 is provided with a cam surface 37b adapted to coact with a cam surface 47b formed on an arm 47c of the detent, as shown in FIG. 18. If the lever 37 is moved further toward the right, from the position shown in FIG. 18, the coaction of the cam surfaces 37b and 47b causes the pawl 43 and the detent 47 to move out of engagement with the ratchet wheel and, after this disengagement has been effected, it may be retained by the action of a roller 51 which is mounted on a pin 52 extending between the side plates 37a of the tensioning lever. As the lever 37 approaches its extreme lower position, the roller 51 rides over a cam surface 53a formed on an arm 53 which extends upwardly from the handle 50 and, at the end of this movement, the roller 51 rides over a projecting shoulder 53b at the lower end of the cam surface 53a so that the lever 37 is then held in this lower retracted position.

The movement of the lever 37 to the position which has just been described, where it is held by the projection 53b, also operates to tilt the auxiliary frame about the pin 25 to elevate the tensioning wheel 31 from the strap against the action of a coil spring 55. This coil spring extends between a lug 56 formed on the handle 50 and a lug 57 which is formed on the auxiliary frame so that it acts normally to move the tensioning wheel into gripping engagement with the top surface of the supply portion 21b of the strap. When the lever 37 has been moved to its lower position adjacent to the handle 50, the ratchet wheel 42 and the tensioning wheel 31 are elevated and are free to rotate and, assuming a joint has then been formed between the overlapping strap ends, the tool may be removed laterally from engagement with the strap extending around the package.

When the tensioning lever 37 is held in its lower position by the engagement of the roller 51 with the shoulder 53b, the resilient shearing blade 28 is adjusted by a latch lever 58 which is pivotally mounted on a bolt 59 secured in the auxiliary frame 26. This lever has a downwardly extending arm 58a which extends through an aperture 28a in the shearing blade 28, as shown in FIGS. 6 and 8, and it is provided with a hook portion 58b which is adapted to extend beneath the blade 28. The latch lever 58 is normally moved in a clockwise direction, as shown in FIG. 6, by a coil spring 60 which is mounted in a recess in a lug 61 carried by the auxiliary frame and which engages a lug 58c projecting from the lever 58. The spring 60, therefore, causes the hook portion 58b to extend beneath the shearing blade 28, as shown in FIG. 6, but the lever may be removed from this position by pressing on a thumb plate 58d which is formed on the outer end of the lever arm.

With the auxiliary frame 26 and the tensioning wheel 31 elevated, as described above, the latch lever 58 holds the resilient shearing blade upwardly to form a gap above the gripping member 27 through which the free end 21a of the strap may be inserted. If the latch lever 58 be then depressed, the resilient shearing blade 28 returns to its normal position and exerts a gripping pressure on the strap portion 21a. Since the tensioning wheel 31 is then elevated, the supply portion 21b of the strap may then be inserted beneath the tensioning wheel and over the shearing blade 28 after the strap has been looped around the object to be bound. The tensioning lever 37 may then be moved upwardly to cause the roller 51 thereon to ride over the projecting shoulder 53b of the arm 53 with the result that the auxiliary frame 26 is tilted downwardly about its pivot 25 and the tensioning wheel 31 is brought into gripping engagement with the upper surface of the portion 21b of the strap. The lever 37 may then be reciprocated to operate the tensioning wheel 31 through the ratchet wheel 42 for the purpose of drawing the strap taut around the object to be bound. During this operation, the tensioning wheel 31 presses upon the upper surface of the portion 21b of the strap and this pressure is transmitted to the shearing blade 28 which presses upon the free end portion 21a of the strap to hold it in tight engagement with the gripping member 27. In this way the gripping means and the tensioning means are in part combined with the shearing blade 28 which is subsequently used for cutting off the strap, thus simplifying the structure of the unit as a whole and making it unnecessary to use an auxiliary gripping device at a point removed from the tensioning wheel.

The sealing mechanism for forming a joint between the overlapping strap ends at the right of the stationary cutting blade 28, as viewed in FIG. 6, is mounted in a housing 65 carried by the auxiliary frame 26 and comprising upwardly extending side walls 65a and 65b. The wall 65b is extended upwardly and operates in conjunction with another wall 66 to form the magazine 67 in which a stack of the metal seals 22 are mounted. The walls 65b and 66 are provided with spaced flanges 66a which form the rear wall of the magazine. The sealing mechanism comprises a sealing head 68 which is mounted to reciprocate vertically in the housing 65 and which is formed in two parts, 68a and 68b, which are secured together by studs 69. The sealing head 68 has journaled therein a shaft 70 which rotates within a bearing sleeve 71 and this shaft has fixed thereon two pinions 72 which are arranged to mesh with rack bars 73 secured to the right hand wall of the housing. On one end of the shaft 70 there is secured a sealing lever 75 and on the other end of the shaft there is secured a disk 76 carrying an eccentrically located pin 77 adapted to control the feeding of the seals from the magazine 67, as hereinafter described.

The side walls of the housing 65 have mounted in the lower parts thereof two pins or bolts 78 on which are pivotally mounted a plurality of sealing jaws 79 having hook-shaped extremities 79a adapted to bend the side walls 22c of the seals beneath the overlapping strap ends during the sealing operation. These jaws have upwardly extending arms 79b which are pivotally connected by pins 80 with links 81 which extend inwardly and into a slot formed in the lower end of the head 68 to which they are pivotally connected by a pin 82. Upon downward movement of the head or plunger 68, the pins 80 are spread apart, thus closing the hook portions 79a of the jaws upon each other. The housing 65 is provided at its lower end with guides 85 which extend inwardly beneath the jaws 79 and which are provided at their inner edges with recesses or grooves 85a adapted to be engaged by the lower edges of the side walls 22c of a seal when this seal is fed from the magazine to a position between the lower parts of the jaws, as shown in FIG. 10. When the jaws are operated to move toward each other they bend these side walls inwardly beneath the overlapping strap ends, as shown in FIG. 11.

The sealing mechanism also comprises a plurality of punches 86 which have vertically extending elongated slots 86a engaged by pins or bolts 78. These punches are provided at their lower edges with curved cutting surfaces 86b which are adapted to cooperate with the adjacent contacting portions of the sealing jaws 77 to shear the edges of the seal and the enclosed strap ends to provide the interlocking projections 22a previously referred to. These punches are provided at their upper edges with inwardly inclined cam surfaces 86c which are adapted to be engaged by rollers 87 mounted to rotate on the pins 80 between the arms 79b of the sealing jaws. When the jaws 77 are in their open positions, as shown in FIG. 10, the rollers 87 are located inwardly on the cam surfaces 86c but, when the plunger 68 is moved downwardly, these rollers ride upwardly on the cam surfaces to the positions shown in FIG. 11, thereby moving the punches 86 downwardly on the pins 78 and causing the edges of the seal and the enclosed strap ends to be sheared transversely to the longitudinal axis of the strap. After a joint has been formed the sealing head 68 is moved upwardly by actuation of the sealing lever 75 and this causes the punches 86 to be returned to their elevated positions by the angular movement of the sealing jaw arms 79b which carry fixed pins 88 arranged to engage shoulders 86d formed on the under sides of the punches, as shown in FIG. 11. The cam surfaces 86c, though shown inclined inwardly, can be contoured as desired to provide any required application of forces on the punches 86.

As the interlocking joint is formed between a seal and the enclosed strap ends by the sealing jaws 79 and the punches 86, the supply portion 21b of the strap is cut off in the plane of the edge 28c of the shearing blade 28 by means of a movable shearing blade 90 which is mounted between the lower edge of the side wall 65a of the housing and the adjacent punch 86. The body portion 90a of this shearing blade extends downwardly between the two pins 78 and is provided with a lower cutting edge 90b which is adapted to cooperate with the shearing blade 28 in severing the portion 21b of the strap in close proximity to one end of the top wall 22b of the seal embodied in the joint which has just been formed. The cutting blade 90 is provided with outwardly extending arms 90c having formed on the upper edge thereof inwardly and downwardly converging cam surfaces 90d which are engaged by rollers 91 mounted on the pins 80. When the joint has been formed by the relative angular movement of the opposed sealing jaws 79 and by the downward movement of the punches 86, and, as the strap is cut off by the shearing blade 90, the free end portion 21a of the strap is supported beneath the sealing mechanism by supporting jaws 92 which are formed on two of the opposed sealing jaws 79 and which are adapted to swing inwardly toward each other as the sealing jaws close upon each other so that they extend beneath the portion 21a of the strap, as shown in FIG. 13. The movable shearing blade 90 is so constructed that its downward movement will be terminated above the upper surface of the lower portion 21a of the strap so that only the supply portion 21b of the strap will be severed by the movement of the blade. When the joint has been formed and the supply portion of the strap cut off, the elevation of the sealing head 68 and the opening of the jaws 79 causes the pins 88 to elevate the shearing blade 90 by the engagement thereof with the undersides of the arms 90c of the shearing blade. The cam surfaces 90d are shown downwardly converging, but they can be of any desired contour necessary to provide maximum force application at the desired time. These cam surfaces 90d on the cutting blade 90, as well as the cam surfaces 86c on the sealing punches 86, provide a simple and convenient means for providing any force variations on these parts as required. Where linkages are used exclusively, as in the ordinary case, greater difficulty is encountered in designing the linkages to obtain the desired application of forces at the right time.

The seals 22 which are superimposed in the magazine are moved downwardly by a weight 93 which is arranged to slide vertically in the magazine and which is normally moved in a downwardly direction by a coil spring 94 which has one end attached to the pin 95 fixed on the lower end of the magazine and which has its other end wound on a spool 96 arranged to rotate in the cavity of the weight 93. The seals are so formed that the top walls 22b thereof are spaced apart when they are superimposed in the stack and the action of the weight 93 and the spring, supplemented by gravity, cause the lowermost seal to move downwardly so that the lower edges of its side walls are supported on hook-shaped retaining members 97 which are similar to the members 85 by which a seal is supported between the jaws 79. The lowermost seal in the stack is adapted to be fed from the magazine to the position between the jaws which is illustrated in FIG. 10, by means of a feeding finger 98 which is provided at one end with a groove 98a adapted to engage the top wall of the lowermost seal. This feeding finger is provided with flanges 98b which are pivotally mounted on a pin 99 carried by a bell-crank lever 100. This lever is pivotally mounted on a pin 101 secured in brackets 102 extending laterally from the wall 66 of the magazine. The lever 100 is provided with an arm 100a having formed on the end thereof an inclined cam surface 100b adapted to be engaged by the previously described pin 77 fixed on the disk 76 at the end of the shaft 70. A coil spring 103 is mounted on the pin 101 with one arm 103a engaging the wall 66 of the magazine and with the other arm 103b thereof engaging the upper end of the body portion of the lever 100 so that this spring normally moves the lever 100 in a clockwise direction, as viewed in FIG. 6. When the pin 77 is moved downwardly by the downward movement of the shaft 70 in response to the angular movement of the lever 75, the lever 100 is rocked about its pin 101 into the position shown by the dotted lines in FIG. 18.

A coil spring 105 is mounted on the pin 99 with one end thereof engaging the body portion of the lever 100 and with the other end thereof engaging the feeding finger 98 so that the feeding finger is normally turned by this spring in a clockwise direction, as viewed in FIG. 6, to engage an adjustable stop screw 106 which is mounted on the lower end of the magazine wall 66. When the sealing head is in its lowermost position with its sealing jaws closed upon each other, as shown in FIG. 11, the seal feeding finger 98 is prevented from feeding a seal from the magazine due to the presence of an upwardly extending seal gate 107 which is secured on the base of the frame 24. However, when the sealing mechanism is moved upwardly after the formation of a joint, by raising the auxiliary frame 26, the sealing jaws are separated and the feeding finger 98 is then actuated by the spring 103 to cause the lowermost seal in the stack to be projected into a position between the jaws 79 where it is supported by the members 85, as shown in FIG. 10. This seal is then positioned in the sealing mechanism in readiness for the formation of another sealed joint when new strap ends have been located in an overlapping position and the strap has been drawn taut around the object to be bound. After a joint has been formed and the parts have been retracted in readiness for a new operation, just referred to, the free end of the strap which has been cut off remains in position on the gripping member 27, being held by the resilient shearing blade 28 so that, as a preliminary to a new binding operation, it is merely necessary to shift the free end of the strap endwise beneath the plate 28 until a sufficient portion thereof projects beneath the sealing apparatus, as shown in FIG. 6.

The strapping tool described above is normally placed on the top surface of the box or other object to be bound and it may be conveniently moved about by a handle 110 which is secured to the walls of the housing 65. In some instances, it may be desirable to use the strapping tool in a position where the flat outer surface of the main frame 24 occupies a vertical position against the side of the object to be bound. For convenience in such an operation, the main frame is provided with projecting ears 111 provided with apertures 111a adapted to be engaged by suspending hooks or the like so that the tool may be supported in operating position. When in such position, it is desirable, further, to prevent downward swinging of the sealing lever 75 from the position shown by full lines in FIGS. 2 and 5, which might result in a premature operation of the sealing apparatus. For that purpose, the auxiliary frame 26 has formed thereon a lug 112 provided with a cylindrical bore 112a in which there is slidably mounted a plunger 113. This plunger has a head 113a provided with a conical extremity 113b adapted to engage a recess in a hard metal insert 114 which is secured in an aperture in the lever 75, as shown particularly in FIG. 7. The plunger 113 is actuated by a coil spring 115 mounted within the bore 112a so that when the lever 75 is in the position shown by full lines in FIGS. 1 and 5, the portion 113b of the plunger snaps into interlocking engagement with the member 114 to hold the lever in that position. The end of the plunger 113 which is removed from the head 113a is threaded for engagement by a nut 116 which may be adjusted to vary the normal position of the head 113a.

The fact that this tool provides for sealing the joint before shearing the supply end of the strap is responsible for some of its advantages. When shearing occurs prior to sealing, as is the usual case, an additional remotely positioned gripper is needed to hold the supply end of the band after shearing, but before sealing, to prevent release of tension in the band. By virtually completing the sealing operation prior to shearing, as in the present invention, the sealed joint itself holds the supply end of strap as a remotely positioned gripper would otherwise do, thus obviating the need for the remotely positioned gripper. Actually, on the particular tool shown, the shearing occurs approximately during the last ten percent of pivotal movement of the sealer jaws when sealing is almost entirely completed.

One form of the invention has been shown and described by way of illustration, but it will be understood that it may be constructed in various other embodiments which come within the scope of the appended claims.

We claim:

1. The combination in a strapping tool, of a main frame, a gripping member mounted on said frame for engaging the underside of the free end of a metal strap looped around a package, an auxiliary frame movably mounted on said main frame, a resilient shearing blade mounted on said main frame to press said free end of said strap against said gripping member, tensioning means mounted on said auxiliary frame to engage the upper side of the supply portion of said strap to press it against said shearing blade, means to elevate said auxiliary frame to move said tensioning means away from said supply portion, and means connected to said auxiliary frame and coupled detachably to said shearing blade for elevating the latter with respect to said gripping member.

2. The combination in a strapping tool, of a main frame, a gripping member mounted on said frame for engaging the underside of the free end of a metal strap looped around a package, an auxiliary frame movably mounted on said main frame, a resilient shearing blade mounted on said main frame to press said free end of said strap against said gripping member, tensioning means mounted on said main frame to engage the upper side of the supply portion of said strap to press it against said shearing blade, means to elevate said auxiliary frame to move said tensioning means away from said supply portion, means connected to said auxiliary frame and coupled detachably to said shearing blade for elevating the latter with respect to said gripping member, and means adapted to cooperate with said shearing blade to sever said supply portion of said strap.

3. The combination in a strapping tool, of a main frame, a gripping member mounted on said frame for engaging the underside of the free end of a metal strap looped around a package, an auxiliary frame movably mounted on said main frame, a resilient shearing blade mounted on said main frame to press said free end of said strap against said gripping member, tensioning means mounted on said auxiliary frame to engage the upper side of the supply portion of said strap to press it against said shearing blade, means to elevate said auxiliary frame to move said tensioning means away from said supply portion, and a latch lever mounted on said auxiliary frame and having a hook releasably engaging said blade, said latch lever serving to elevate said shearing blade from said gripping member when said auxiliary frame and said tensioning means are elevated.

4. The combination in a strapping tool of a main frame, a gripping member mounted on said frame for engaging the underside of the free end of a metal strap looped around a package, an auxiliary frame movably mounted on said main frame, a resilient shearing blade mounted on said main frame and having a portion positioned above and biased toward said gripping member for securing removably in position said free end of said strap while the supply portion of said strap is positioned on the upper surface of said blade, means mounted on said auxiliary frame and disposed to engage and press against the upper side of the supply portion for increasing the tension of said strap and enhancing the securing action of said blade and said member, and means coupled to said auxiliary frame for moving the latter and said tensioning means away from the supply portion of said strap.

5. In a strapping tool, a sealing mechanism comprising: a supporting frame; a first set of sealing jaws including at least one shearing punch movably mounted in said frame, and a second set of sealing jaws including at least one movably-mounted shearing punch disposed in said frame opposite to, and for cooperation with, said first set in bending opposite sides of a channel-shaped seal beneath overlapping portions of a strap; means coupled to said sealing jaws for actuating said jaws to affix a seal, and for effecting linear movement of said punches to form an interlocking joint by shearing the lateral edges of the seal and overlapped strap portions.

6. In a strapping tool, a sealing mechanism comprising: a supporting frame; a first set of sealing jaws pivotally mounted in said frame, said first set including shearing punches provided with cam surfaces and mounted for linear reciprocation in interleaved relationship with the jaws of said first set; a second set of sealing jaws pivotally mounted in said frame in opposing relation to said first set, said second set also including shearing punches provided with cam surfaces and mounted for linear reciprocation in interleaved relationship with the jaws of said second set; means coupled pivotally to the jaws and engaging in thrusting relation the cam surfaces of punches in said first and second sets for producing, successively, pivotal movement of said jaws to affix a seal to overlapping portions of a strap and linear movement of said punches to form an interlocking joint by shearing the lateral edges of the seal and overlapped strap portions.

7. A strapping tool for tightening a strap placed around an object to form a loop having a closure section made up of a second portion overlying a first portion of said strap, and for applying a seal to and interlocking said first and second portions at said closure section, said strapping tool comprising in combination: a main frame; means including a resilient shearing blade secured to said main frame for gripping said first portion only between said blade and said main frame while said second portion of said strap is positioned to extend beyond but overlie said blade in stacked relation with said first portion and said main frame, respectively, thereby forming said loop and closure section; an auxiliary frame; first means mounted on said auxiliary frame and engaging said second portion for reducing the size of said loop, thereby making it possible to tighten said strap around an object; second means mounted on said auxiliary frame and including at least one seal for applying the latter to said closure section, said second means also including further means for forming an interlocking joint at said closure section in cooperation with said seal, and means cooperating with said shearing blade to sever said strap extending from said interlocking joint outside said loop; and means movably coupling said auxiliary frame to said main frame to facilitate installation and removal of the first and second portions of said strap.

8. The combination in a strapping tool, of a gripping member for engaging the under side of the free end of a metal strap looped about a package, a stressed flexible resilient shearing blade biased toward and adapted to engage the upper side of the free end of the strap and to press the free end against said gripping member, lifting means detachably coupled to said shearing blade for flexing the same in a direction away from said gripping member to permit convenient initial disposition of the free end of the strap in a predetermined position in engagement with said gripping member, and means for detaching said lifting means from said shearing blade while said shearing blade is in its flexed position, thereby permitting said shearing blade quickly to snap back toward said gripping member and into clamping engagement with the upper side of the free end of the strap in said predetermined position.

9. The combination in a strapping tool, of means for drawing a metal strap taut around a package with its free end overlapping its supply end, means for applying a seal to the strap ends to form an interlocking joint, a thin resilient and flexible shearing blade having a free end portion arranged to extend between the strap ends and to a position immediately adjacent to an end of the seal, gripping means arranged immediately below said shearing blade and co-operable with a portion of said blade inwardly of said free end portion thereof to grip the free end of the strap, a reciprocating shearing blade co-operable with the extremity of said free end portion of said resilient shearing blade to sever the supply portion of the strap, and retractable jaws adaptable to move under said free end portion of said resilient shearing blade to engage the strap thereunder and to support the same and said shearing blade when said reciprocating shearing blade is actuated to sever the strap.

10. The combination in a strapping tool, of sealing mechanism comprising pivotally mounted sealing jaws adapted to engage opposite sides of a channel-shaped seal overlapping the strap ends, a plurality of shearing punches arranged alternately with said jaws and mounted for relative movement with respect thereto, said punches having cam surfaces formed thereon, and means including a reciprocable plunger coupled to said jaws for pivotally moving the same to bend the side walls of a channel-shaped seal about the overlapping strap end and rollers coupled to said plunger for engaging said cam surfaces for moving said punches with respect to said jaws and into engagement with the seal to form an interlocking joint by shearing the lateral edges of the seal and the overlapping strap ends, thus shearing the lateral edges of the seal after the side walls have been bent.

11. The combination in a strapping tool, of sealing mechanism comprising pivotally mounted sealing jaws adapted to engage opposite sides of a channel-shaped seal embracing overlapping strap ends, a plurality of shearing punches arranged alternately with said jaws and mounted for relative movement with respect thereto, said punches having cam surfaces formed thereon, drive means including a reciprocable plunger coupled to said jaws for pivotally moving the same to bend the side walls of a channel-shaped seal about the overlapping strap ends, said drive means engaging said cam surfaces for moving said punches with respect to said jaws and into engagement with the seal to form an interlocking joint by shearing the lateral edges of the seal and the overlapping strap ends, and means carried by said jaws and engaging said punches for withdrawing the latter after completion of the shearing action by said punches and upon separation of said jaws, thus shearing the lateral edges of the seal after the side walls have been bent.

12. The combination in a strapping tool, of sealing mechanism comprising pivotally mounted sealing jaws adapted to engage opposite sides of a channel-shaped seal embracing overlapping strap ends, a plurality of shearing punches arranged alternately with said jaws and mounted for relative movement with respect thereto, said punches having cam surfaces thereon, drive means including a reciprocable plunger coupled to said jaws for pivotally moving the same to bend the side walls of a channel-shaped seal about the overlapping strap ends, said drive means engaging said cam surfaces for moving said punches with respect to said jaws and into engagement with the seal to form an interlocking joint by shearing the lateral edges of the seal and the overlapping strap ends, and pins projecting from said jaws and engaging said punches for withdrawing said punches after completion of the shearing action by said punches and upon separation of said jaws, thus shearing the side walls after the side walls have been bent.

References Cited in the file of this patent

UNITED STATES PATENTS

| | | | |
|---|---|---|---|
| 1,874,518 | Harvey | Aug. 30, | 1932 |
| 1,905,052 | Porter | Apr. 25, | 1933 |
| 1,996,202 | Harvey | Apr. 2, | 1935 |
| 2,067,806 | Waldorf | Jan. 12, | 1937 |
| 2,097,980 | Johnson | Nov. 2, | 1937 |
| 2,218,023 | Doolittle | Oct. 15, | 1940 |
| 2,223,164 | Childress | Nov. 26, | 1940 |
| 2,375,769 | Childress et al. | May 15, | 1945 |
| 2,386,153 | Walt et al. | Oct. 2, | 1945 |
| 2,536,536 | Childress et al. | Jan. 2, | 1951 |
| 2,661,030 | Crosby et al. | Dec. 1, | 1953 |
| 2,777,344 | Smith | Jan. 15, | 1957 |

FOREIGN PATENTS

| | | | |
|---|---|---|---|
| 929,538 | Germany | June 27, | 1955 |